United States Patent

Colistro

[11] Patent Number: 5,127,214
[45] Date of Patent: Jul. 7, 1992

[54] ROTARY MOWER FOR SHALLOW ANGLE FURROWS

[75] Inventor: Vincent A. Colistro, Humboldt, Canada

[73] Assignee: Schulte Industries Ltd., Saskatchewan, Canada

[21] Appl. No.: 699,962

[22] Filed: May 14, 1991

[51] Int. Cl.⁵ .................... A01D 34/66; A01D 75/30
[52] U.S. Cl. ........................................ 56/6; 56/17.1
[58] Field of Search ................ 56/6, 17.1, 13.5, 13.6, 56/DIG. 10

[56] References Cited

U.S. PATENT DOCUMENTS

| | | | |
|---|---|---|---|
| 3,418,790 | 12/1968 | Whitfield et al. | 56/6 |
| 3,452,530 | 7/1969 | Kulak | 56/6 |
| 3,564,822 | 2/1971 | Engler | 56/6 X |
| 4,538,400 | 9/1985 | Hottes | 56/6 X |
| 4,887,372 | 12/1989 | Block | 37/91 |
| 4,958,484 | 9/1990 | Busboom | 56/6 X |
| 5,031,389 | 7/1991 | Yawn et al. | 56/6 |

Primary Examiner—David J. Bagnell
Attorney, Agent, or Firm—Jacobson and Johnson

[57] ABSTRACT

A rotary mower is used for mowing shallow angle furrows. The mower has two wings carrying large side cutters for cutting opposite sides of the furrow. The side cutters are spaced apart at the center to eliminate any need for synchronization of their rotors. A small center cutter is carried at a trailing location, between the main side cutters to cut the center area between the two side cutters.

15 Claims, 4 Drawing Sheets

ROTARY MOWER FOR SHALLOW ANGLE FURROWS

FIELD OF THE INVENTION

The present invention relates to mowers and more particularly to a mower for mowing shallow angle furrows, for example furrows used for drainage between rows of trees in orchards.

BACKGROUND OF THE INVENTION

Rotary mowers for mowing shallow angle furrows are constructed with two pivotally connected cutting wings. The rotary cutters carried by the wings are driven from the power take-off of a towing tractor. In order to mow a complete furrow, including sides and bottom, the cutters cut swaths that overlap at the bottom. This requires the two cutters to be synchronized with their blades in a 90° out of phase relationship. This relationship must be maintained at all times in order to avoid damage to the cutters. Synchronization of the rotary cutters on a machine in which the wings must fold can result in a less than ideal drive line arrangement, which in turn may result in undesirable fluctuations in cutter speed. In addition, where one of the cutters is halted by engaging a foreign object, the complete drive train must be halted producing very high shock loadings in the drive system.

The present invention is concerned with a novel rotary mower for shallow furrows in which these problems are eliminated or ameliorated.

SUMMARY OF THE INVENTION

According to the present invention there is provided a mower for mowing a shallow furrow with two substantially flat sides as the mower is advanced along the furrow in a forwards direction of travel, the mower comprising:

mower housing means including two mower wing and means coupling the wings for pivotal movement of each wing with respect to the other about an axis extending in the direction of travel;

two side cutter means each mounted on a respective one of the wings, each side cutter means comprising cutting assembly and cutter rotating means for rotating the cutting assembly about an upright axis so as to cut a side swath below the wing, the cutting assemblies of the two wings being so positioned that the side swaths cut thereby are spaced apart a distance substantially less than the width of each side swath; and centre cutter means mounted on the mower housing means for cutting a centre swath between and overlapping the two side swaths, the centre swath being substantially narrower than each side swath.

The side cutters are separated so that synchronization is no longer necessary and the pulsations introduced by universal joints acting through an angle are no longer a significant problem. The remaining narrow uncut strip between the swaths cut by the side cutters is cut by the small centre cutter. The centre cutter is preferably less than one half the size of the side cutters and most preferably about one quarter their size.

The drive trains for the individual mowers may have independant torque limiters slip clutches so that stopping one rotary cutter will not stop all of the rotary cutters, thus reducing considerably the shock loadings to the drive system.

BRIEF DESCRIPTION OF THE DRAWINGS

In the accompanying drawings which illustrate an exemplary embodiment of the present invention.

DETAILED DESCRIPTION

Figure 1:
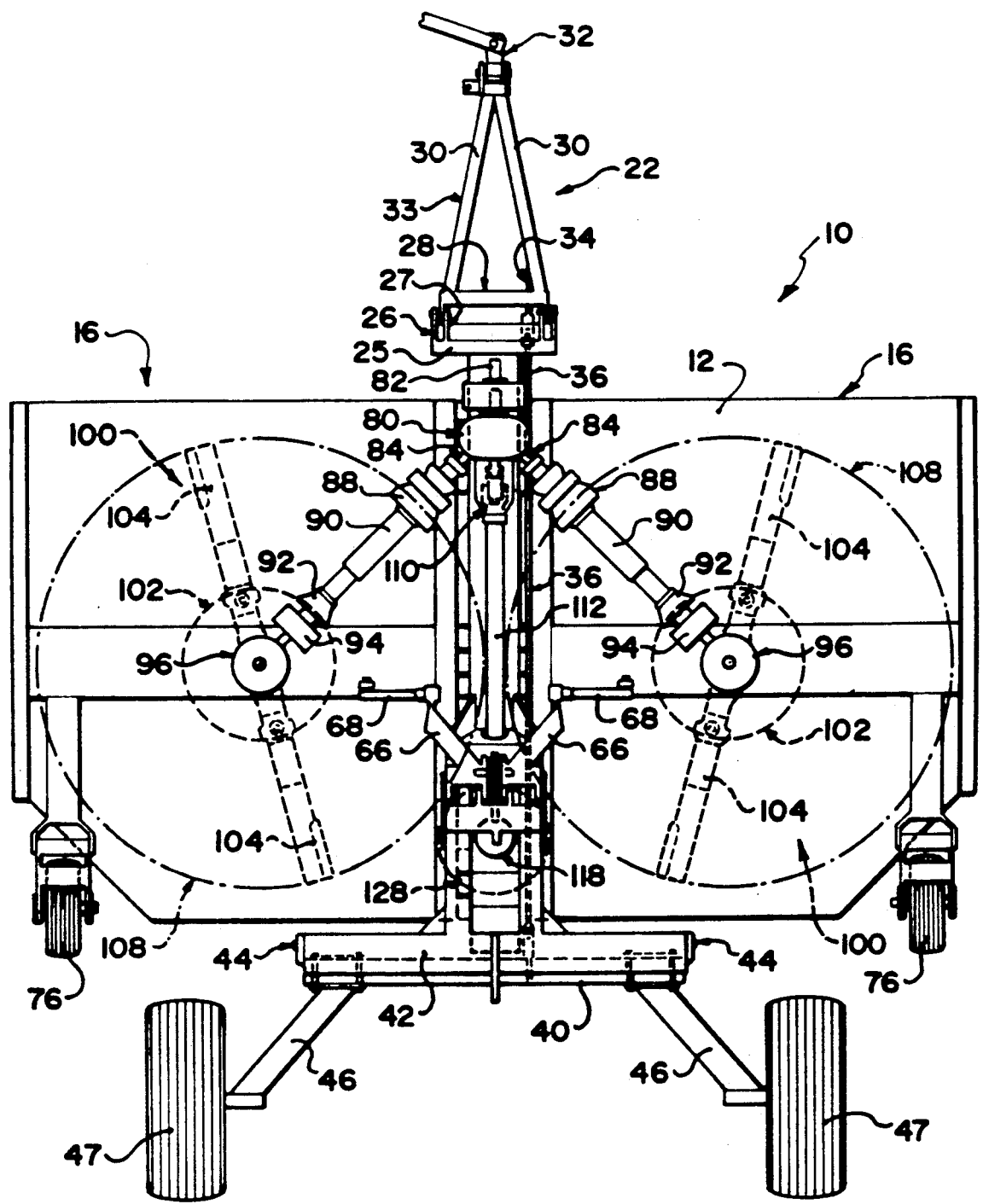
FIG. 1 is a plan view of a mower.
Figure 2:
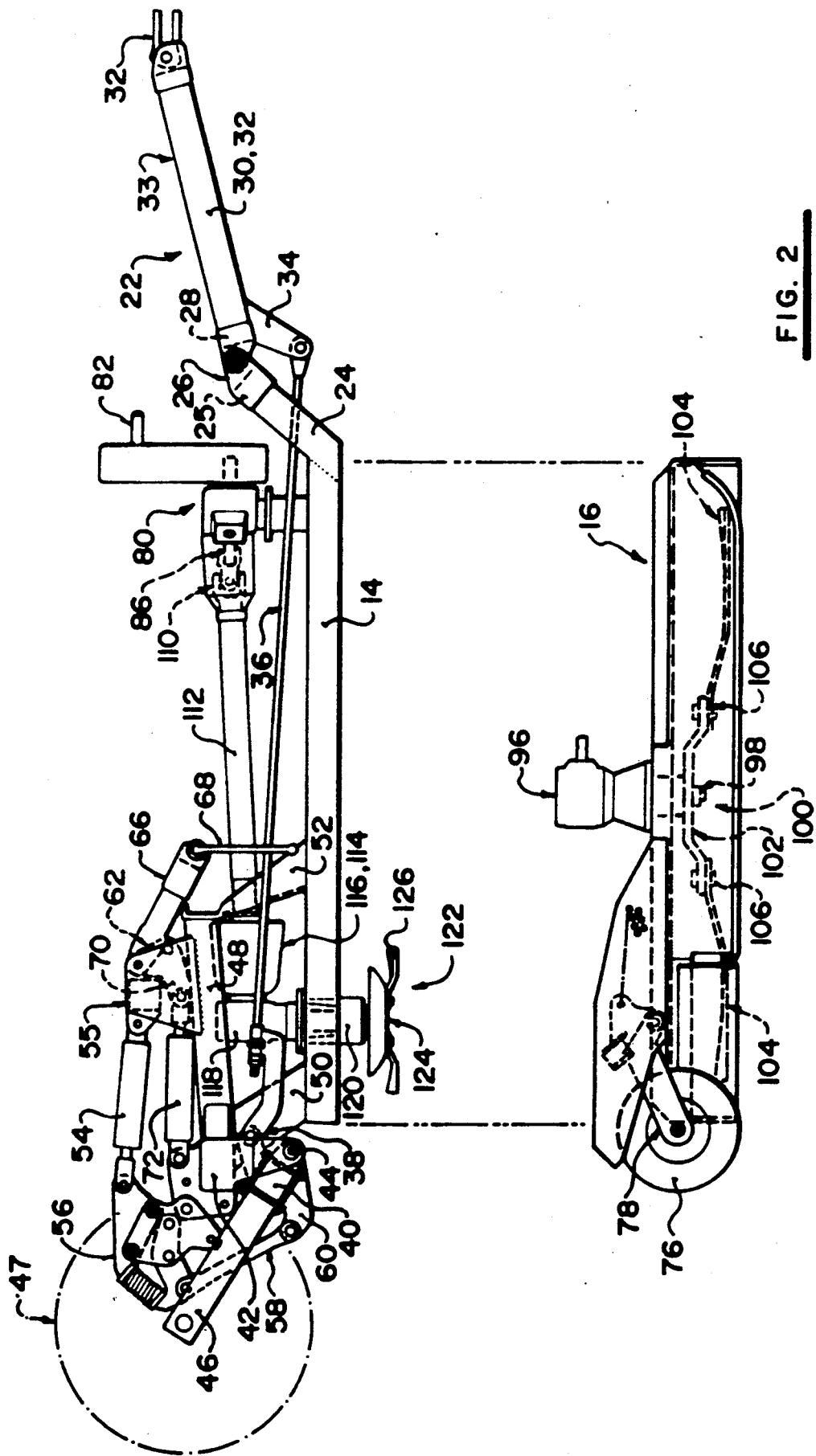
FIG. 2 is a side elevation of a mower.
Figure 3:
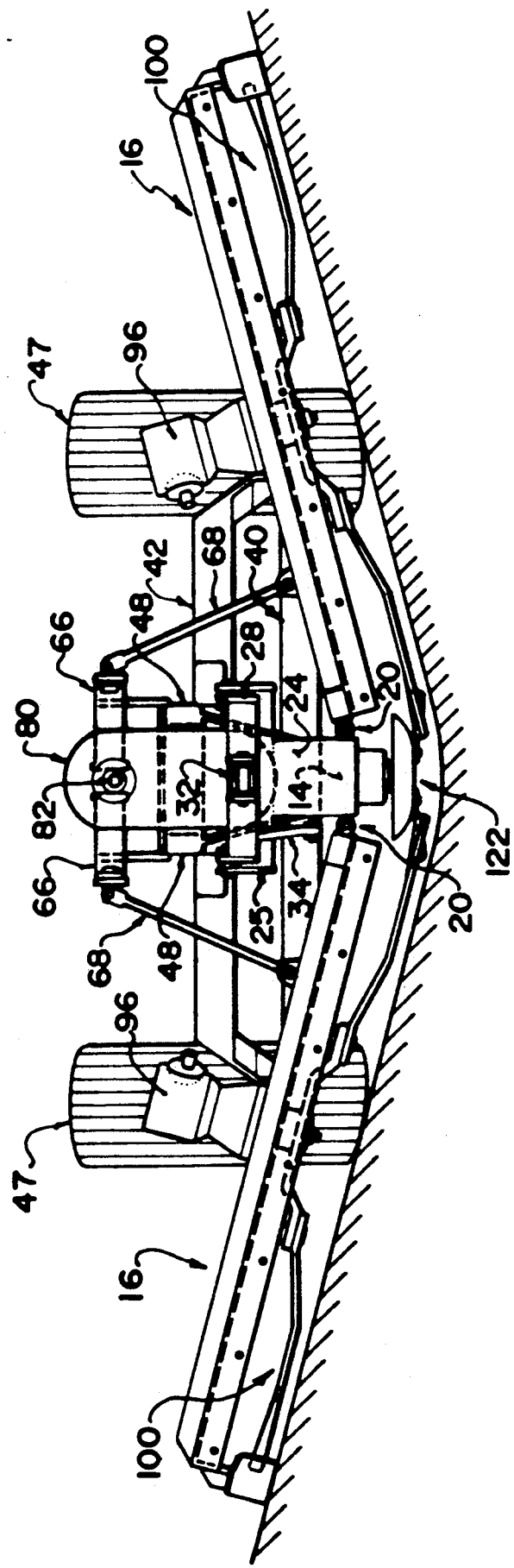
FIG. 3 is an end elevation of the mower.

Referring to the accompanying drawings, there is illustrated a mower 10 with a mower housing 12 including a centre section 14 in the form of a rectangular box beam and two wings 16 mounted on opposite sides of the centre section by hinges 20. A tongue 22 is mounted on the front of the mower and includes an extension 24 fixed to and extending upwardly from the front of the centre section 14 and supports a cross member 25. Two lugs 26 and 27 project upwardly and forwardly from each end of the cross member 25. A cross beam 28 parallel to cross member 25 is pivotally mounted on the lugs 26 and 27. Two beams 30 are connected to the cross beam 28 and converge forwardly to a hitch plate 32. The beams 30 and cross member 28 together constitute a triangular tongue frame 33.

A lever arm 34 is carried by the frame 33. The lever arm is connected to a link 36 extending to the rear of the mower where it is connected to a lever arm 38. Arm 38 is mounted on a cross beam 40 which is in turn pivotally mounted on a cross beam 42 by a pivot 44 with a lateral axis. The beam 40 carries two wheel arms 46 projecting rearwardly and carrying respective support wheels 47 which support the centre section of the mower on the ground.

The cross beam 42 is mounted on the ends of two beams 48 supported on the centre section of the mower housing by a rear support 50 and a front support 52. A hydraulic cylinder 54 is connected at one end to a support structure 55 mounted on the beams 48 and at the other to a pivot linkage 56. The linkage 56 is connected by a link 58 to a lever arm 60 mounted on the beam 40. Extension of the cylinder will pivot the wheel arms and the wheels downwardly to raise the mower housing. The link 36 will simultaneously pivot the lever arm 34 to lower the hitch 32, thus raising the front end of the mower housing.

Figure 4:
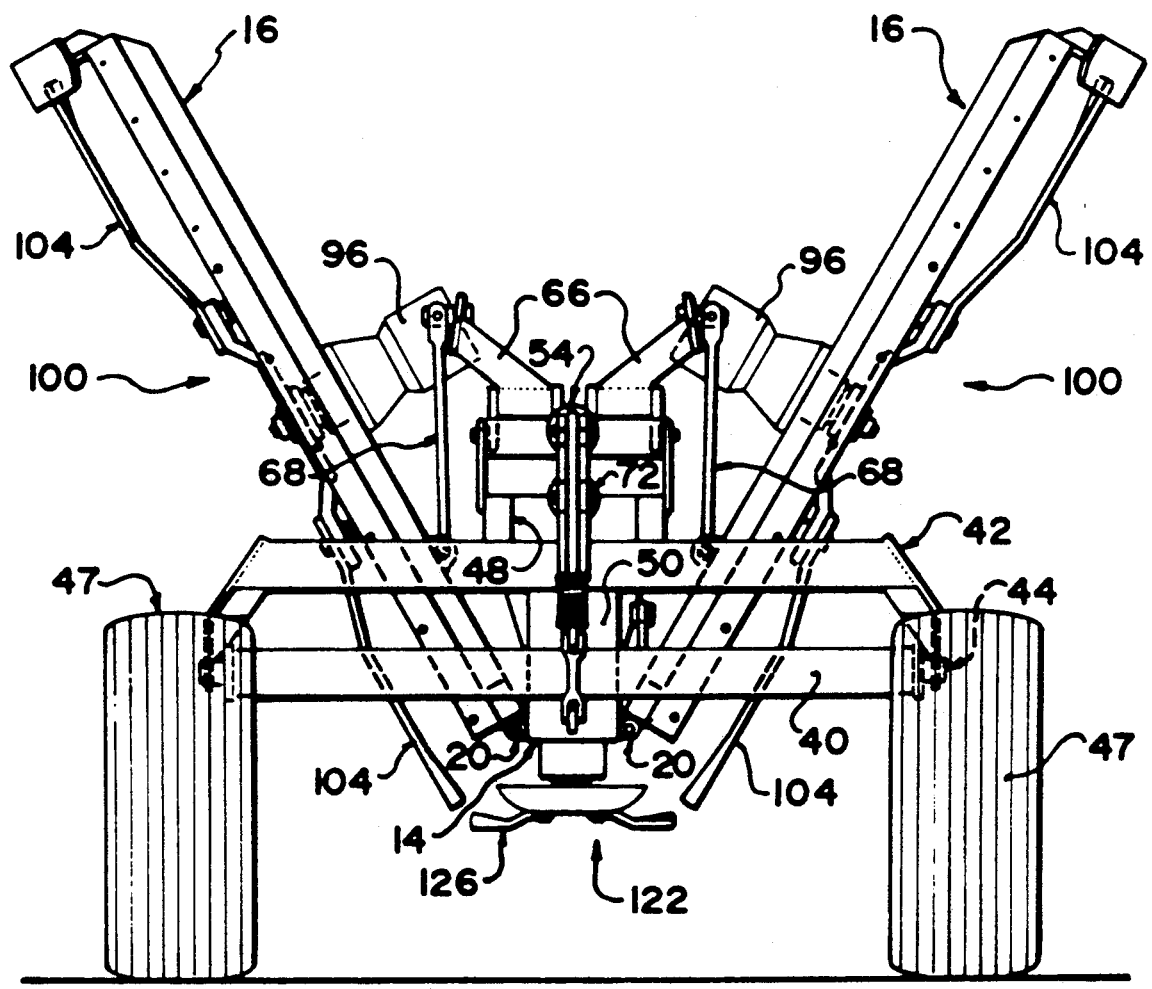
FIG. 4 is an end elevation of the mower in the transport position.

The support structure 55 carries a bell crank 62. Two arms 66 of the bell crank are connected to the housing wings 16 by links 68 so that as the bell crank is rotated, the wings will be lifted to the transport position illustrated in FIG. 4. The other arm 70 of the bell crank is connected to the rod of a hydraulic cylinder 72. The cylinder is connected to the beam 42. Extension of cylinder 72 raises the wings to the transport position (FIG. 4).

The two wings 16 are equipped with wheels 76, mounted behind the wings by respective arms 78, so that the wings will follow the ground level when lowered.

Mounted on the front of the housing centre section 14 is a gear box 80 with an input 82 for connection to a tractor power take off and three outputs, including two side outputs 84 and a centre output 86. Each of the side outputs is connected through a double universal joint 88 to a drive shaft 90. The universal joint is located adjacent one of the hinges 20. The opposite end of the drive shaft 90 is connected to a further universal joint 92 driving a torque limiting slip clutch 94. The slip clutch is coupled to the input of a right angle gear box 96 located to the rear and one side of the gear box 90. The gear box 96 has an output shaft 98 extending through the housing where it is connected to a side cutter 100.

Each side cutter has a cutting assembly consisting of a rotor 102 mounted on the gear box output shaft 98 for rotation about the upright axis of the shaft, and two blades 104 mounted at diametrically opposed positions on the rotor by bolts 106. The blades will pivot about respective upright axes on the bolts and are normally kept in a radial position by centrifugal forces generated by rotation of the rotor. The blades sweep a circular area 108 beneath the wing and the centre section of the housing. The two areas 108 are spaced apart slightly at the centre.

The centre output 86 of the gear box is connected to a universal joint 110, which drives a shaft 112 extending directly to the rear over the centre housing section 14. At the rear end of the shaft is a second universal joint 114 which drives a torque limiting slip clutch 116 mounted on the input of a gear box 118. The gear box output 120 drives a centre cutter 122 with a cutting assembly consisting of a rotor 124 and blades 126 that are similar in configuration to those of the side cutters, but much smaller in overall size. The diameter of the area 128 swept by the centre cutter is approximately one quarter of the diameter of the area 108 swept by a side cutter 100. This area is to the rear of, and between the swept areas 108.

In use of the mower, the two side cutters cut swaths along the flat sides of the shallow furrow, leaving a narrow, uncut zone along the base of the furrow. The small centre cutter, nested between the side cutters cuts a small swath that overlaps with the swath cut by the side cutters. Because the areas swept by the cutter blades do not overlap, there is no need for synchronization of the blades. The positioning of double universal joints in the side mower drive trains adjacent the wing hinges limits the pulsations in the cutter drives. Where desired, a constant velocity joint may be employed at this location to eliminate pulsations.

While one embodiment of the present invention has been described in the foregoing, it is to be understood that other embodiments are possible within the scope of the invention. The invention is to be considered limited solely by the scope of the appended claims.

I claim:

1. A mower for mowing a shallow furrow with two substantially flat sides as the mower is advanced along the furrow in a forwards direction of travel, the mower comprising:

mower housing means including two mower wings and means coupling the wings for pivotal movement of each wing with respect to the other about an axis extending in the direction of travel;

two side cutter means each mounted on a respective one of the wings, each side cutter means comprising a cutting assembly and cutter rotating means for rotating the cutting assembly about an upright axis so as to cut a side swath below the wing, the cutting assemblies of the two wings being so positioned that the side swaths cut thereby are spaced apart a distance substantially less than the width of each side swath; and centre cutter means mounted on the mower housing means for cutting a centre swath between and overlapping the two side swaths, the centre swath being substantially narrower than each side swath.

2. A mower according to claim 1 wherein the means coupling the wings comprise a centre housing section between the wings, and hinge means pivotally mounting the wings on the centre housing section, the centre housing section being substantially narrower than each wing.

3. A mower according to claim 2 wherein the centre cutter means comprises means for cutting a swath no greater than one half the width of the swath cut by each side cutter means.

4. A mower according to claim 2 wherein the centre cutter means comprises means for cutting a swath no greater than one quarter the width of the swath cut by each side cutter means.

5. A mower according to claim 2 wherein the cutter rotating means include drive means comprising a gear box mounted on the centre housing section and having an input and three outputs, and drive trains coupling each of the cutter means to respective outputs from the gear box.

6. A mower according to claim 5 wherein each drive train includes torque limiting means.

7. A mower according to claim 6 wherein each drive train comprises a drive shaft and universal joint couplings, connected thereto.

8. A mower according to claim 7 wherein the drive trains coupled to the side cutter means each comprise a double universal joint adjacent the hinge means.

9. A mower according to claim 8 wherein the gear box is positioned forwardly from the axes of rotation of the side cutter means.

10. A mower according to claim 2 including support wheels mounted on the centre housing section.

11. A mower according to claim 10 including elevation means for selectively raising the centre housing section on the support wheels.

12. A mower according to claim 11 including tongue means coupled to the centre housing section for towing the mower, the elevation means comprising means for selectively elevating the centre housing section on the tongue.

13. A mower according to claim 12 including tongue pivot means pivotally mounting the tongue on the centre housing section for pivotal movement about a lateral axis, the elevating means comprising means for selectively pivoting tongue between a raised, in use position and a lowered transport position.

14. A mower according to claim 1 wherein the centre cutter means comprises a centre cutting assembly and center rotating means for rotating the centre cutting assembly about an upright axis.

15. A mower according to claim 14 wherein each cutter means comprises a rotor, a plurality of blades and means pivotally mounting each blade on the rotor for rotation about a respective upright axis.

* * * * *